INVENTOR
John M. Hollywood
BY Pennie, Edmonds, Morton, Barrows and Taylor
ATTORNEYS INVENTOR
John M. Hollywood
BY
Pennie, Edmonds, Morton, Barrows and Taylor
ATTORNEYS Sept. 9, 1958 J. M. HOLLYWOOD 2,851,522

TELEVISION

Filed Dec. 13, 1951 5 Sheets-Sheet 3

INVENTOR
John M. Hollywood
BY Pennie, Edmonds, Morton, Barrows and Taylor
ATTORNEYS INVENTOR
John M. Hollywood
BY Pennie, Edmonds, Morton, Barrows and Taylor
ATTORNEYS

TELEVISION

Filed Dec. 13, 1951 5 Sheets-Sheet 5

INVENTOR
John M. Hollywood
BY Pennie, Edmonds, Morton, Barrows and Taylor
ATTORNEYS

United States Patent Office 2,851,522

Patented Sept. 9, 1958

2,851,522

TELEVISION

John M. Hollywood, Forest Hills, N. Y., assignor to Columbia Broadcasting System, Inc., New York, N. Y., a corporation of New York Application December 13, 1951, Serial No. 261,465

8 Claims. (Cl. 178—7.3)

This invention relates to television, and is particularly directed to improving the sharpness or crispness of reproduced television pictures. The invention is applicable to either black-and-white or color television systems, but is especially useful in color systems of the sequential type in order to improve picture sharpness when relatively narrow bandwidths are employed.

The reproduction of geometric detail is an important problem in television. Although many factors are involved, the number of lines per frame, the number of field scansions per second (assuming interlaced scansion) and the bandwidth of the transmitter and receiver circuits are the most important. The vertical resolution of a television picture is largely a function of the number of lines per frame. When the number of lines per frame and the number of fields per second have been fixed, the horizontal resolution is largely a function of bandwidth. With present-day standards of 525 lines per frame, 60 double-interlaced fields per second, and a video bandwidth of approximately four megacycles, the horizontal resolution is somewhat less than the vertical resolution.

In the sequential type of color television system, for example, that described in Goldmark Patent 2,480,571, issued August 30, 1949, the field frequency is considerably higher than that employed in black-and-white television, and consequently a greater bandwidth is required to obtain the same horizontal and vertical resolution. Due to the great demand for channels in the radio frequency spectrum, it has been necessary to limit the bandwidth assigned to color television in order to increase the number of channels available for use, and at the present time the video bandwidth assigned to color television is the same as that assigned to black-and-white, namely, about four megacycles.

Although the addition of color more than compensates for the decrease in geometric detail resulting from limited bandwidth, it is of course highly desirable to minimize such effects. Even in black-and-white television, any improvement in horizontal sharpness aids in equalizing the horizontal and vertical resolutions.

When viewing television pictures, the observer in following the action has little time to delve into any particular area of the picture and focus his attention on any one fine detail unless the detail is stationary and of some special importance. Nevertheless, he will be able to tell whether a picture is sharp or fuzzy. Experience has shown that pictures appearing sharp do not necessarily contain extremely small objects, particularly objects so small that their reproduction requires the ultimate bandwidth of the system. It is the sharpness of objects larger than one or two picture elements which is usually important. If the outlines of such objects are sharp, the overall picture appears clear and may be called crisp.

The horizontal sharpness is largely determined by the speed of transition or slope of the video signal wave in passing from one brightness level to another. The maximum speed of transition or maximum slope is primarily a function of the video pass band from pickup to reproducing device (e. g. cathode ray tube). The present invention is primarily directed toward increasing this speed of transition or slope so that the outlines of objects in the picture are more sharply delineated at their lateral boundaries. In one specific embodiment of the invention the speed of transition can be made approximately twice that of the applied video signal, and in a more elaborate embodiment the speed of transition may be further increased.

Doubling the speed of transition from one brightness level to another gives a resultant picture wherein the outlines of objects wider than a single picture element have substantially the sharpness which would be obtained with a video signal of twice the bandwidth. The resolution of fine repetitive detail is still limited by the bandwidth of the applied viedo signal so that the reproduction of such detail is not correspondingly improved. However, high-detail information in television pictures is for the most part of the nature of isolated steps, and only rarely of a repeated nature approximating a steady state waveform made up of frequency components above the system bandwidth limit. Thus improvement in the reproduction of isolated steps is of great practical importance even though reproduction of fine repetitive detail may not be correspondingly improved. If fine repetitive detail is just within the system bandwidth, the sharpening of the edges of this detail considerably clarifies its reproduction. On the whole, crispened television pictures give the appearance of having been transmitted through a system of greater bandwidth than that actually used, except in the reproduction of high-frequency repetitive patterns such as closely-spaced fine vertical lines.

In a co-pending application of Peter C. Goldmark and James J. Reeves, Serial No. 161,334, filed May 11, 1950, for "Television," circuits have been described for this purpose. Broadly speaking, the video signal is passed through a differentiating circuit which differentiates at least the higher frequency components of the signal. This differentiated signal, with or without subsequent modification, is supplied to the reproducing device along with the normal video signal. Other features are described in that application which need not be mentioned at this point.

The present invention is an improvement on that described in the application just referred to, and enables the transition of the video signal from one light level to another to be hastened more accurately for different transition levels, and without overshoots which may be undesirable in some cases.

The invention is particularly adapted for use in home broadcast receivers, but is useful elsewhere in appropriate circumstances. For example, the invention can be employed in monitor receivers at a broadcast station, and even in the transmission circuits where adequate bandwidth is provided after the picture signal has been crispened.

The invention will be understood by reference to the following description of specific embodiments thereof, taken in conjunction with the drawings in which.

Figure 4:
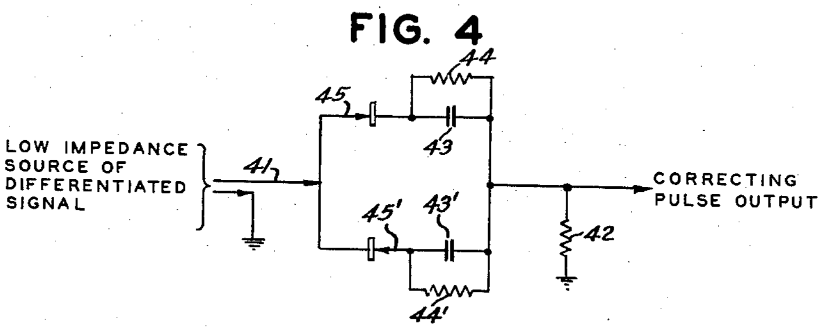
Fig. 4 is a detail of one embodiment of a network for forming crispening pulses.
Figure 6:
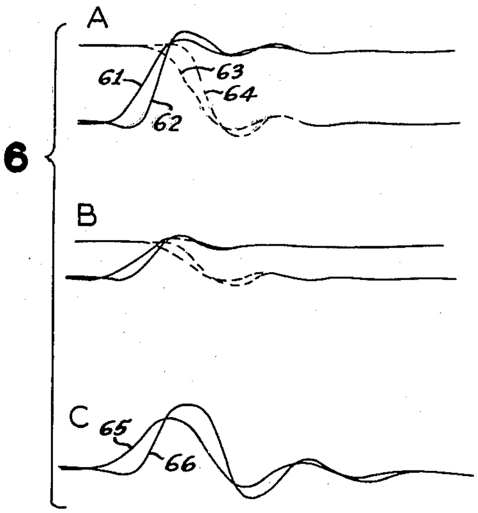
Figure 5A:
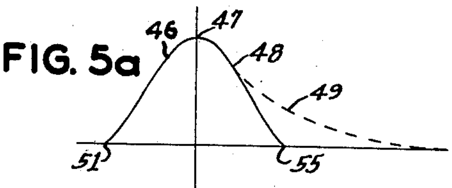
Figure 5B:
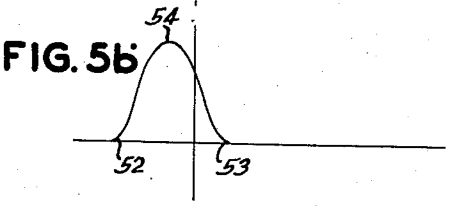
Figure 7:
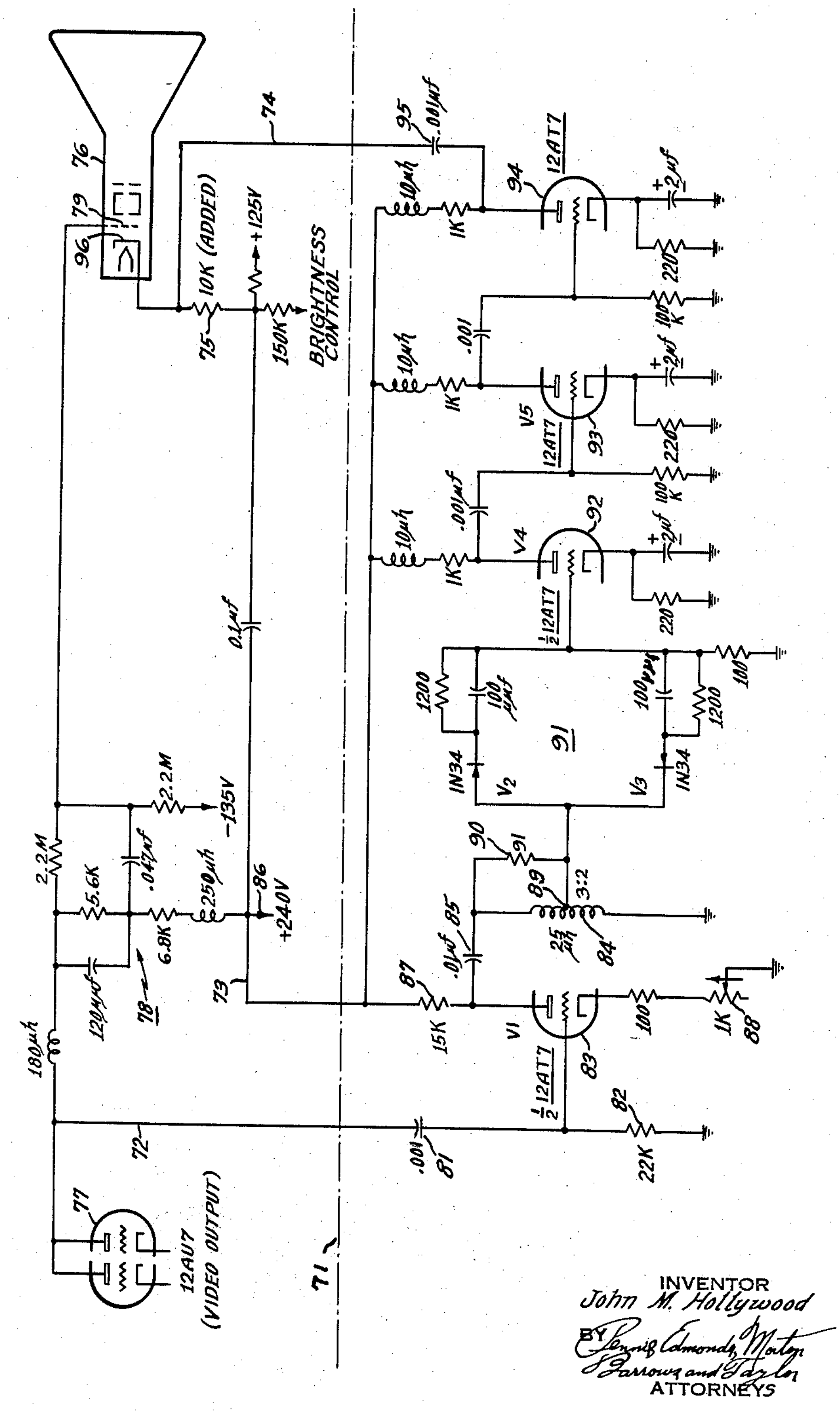
Figure 8:
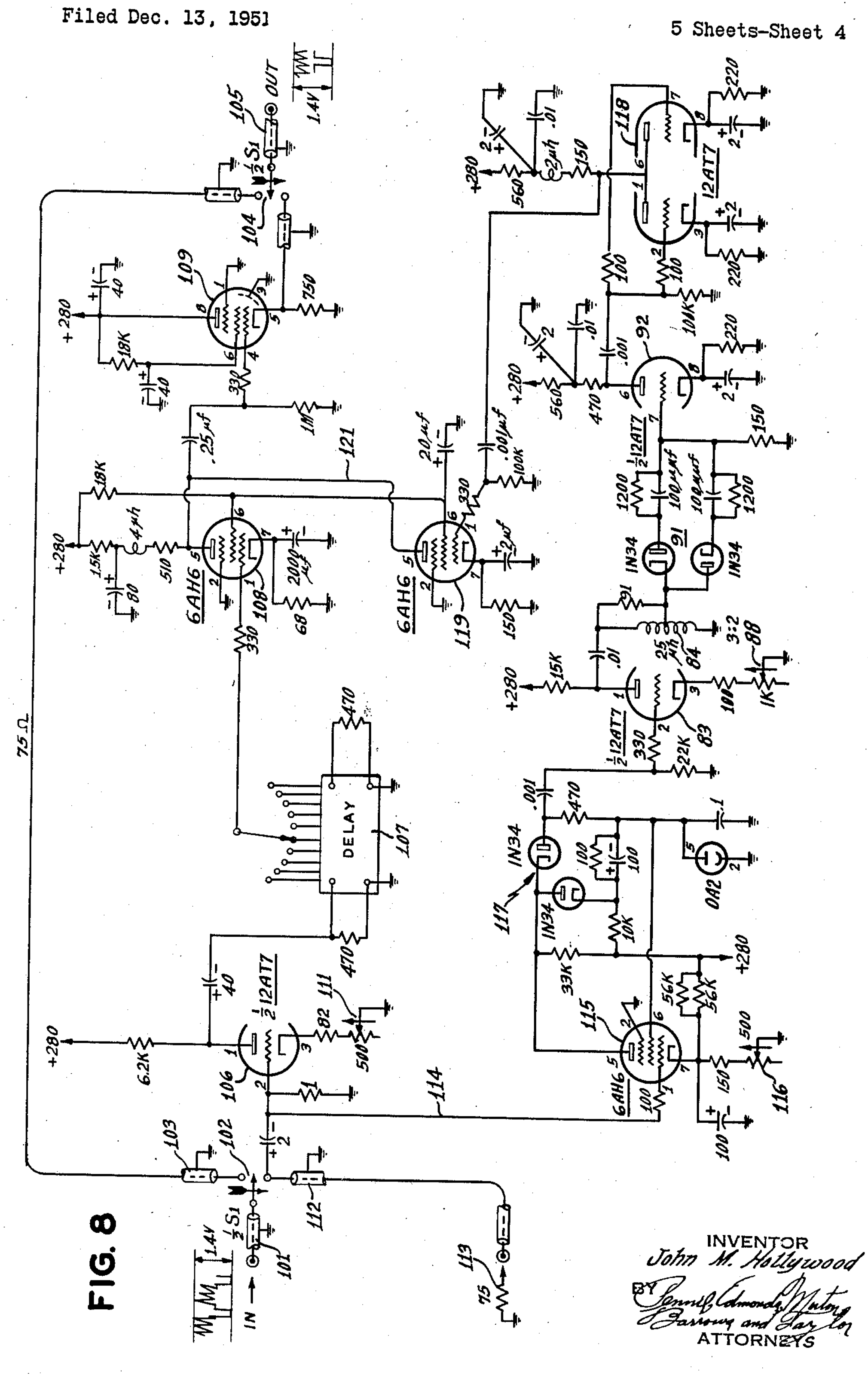
Figure 10:
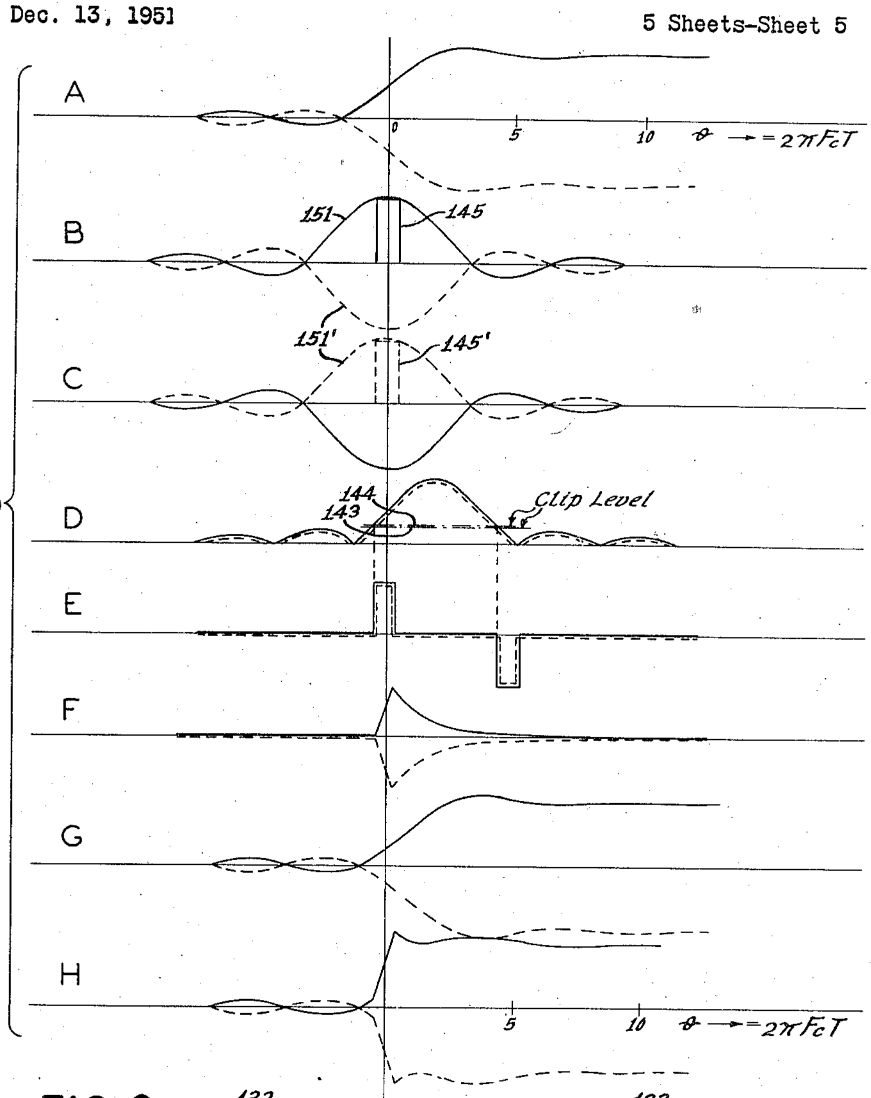
Figure 9:
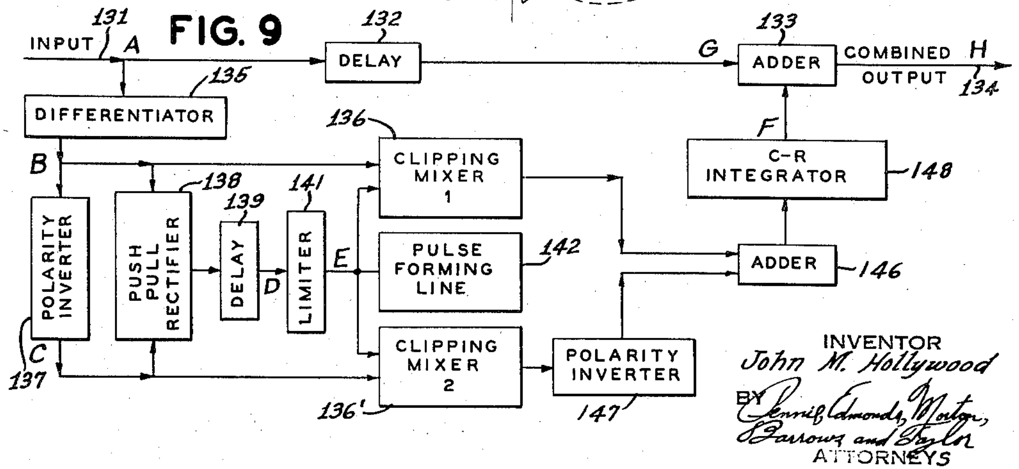

Figs. 5(*a*) and 5(*b*) show wave worms explanatory of the operation of the circuit of Fig. 4;

Fig. 6 shows oscillograph pictures of uncrispened and crispened signals;

Fig. 7 shows one embodiment of the invention as applied to a conventional black-and-white television receiver;

Fig. 8 gives a more elaborate arrangement showing one embodiment of the invention as applied to crispening video signals transmitted over a transmission line of inadequate bandwidth;

Fig. 9 is a block diagram of another embodiment of the invention for further steepening the transition from one signal level to another; and Fig. 10 shows explanatory waveforms for the circuit of Fig. 9.

Figure 1:
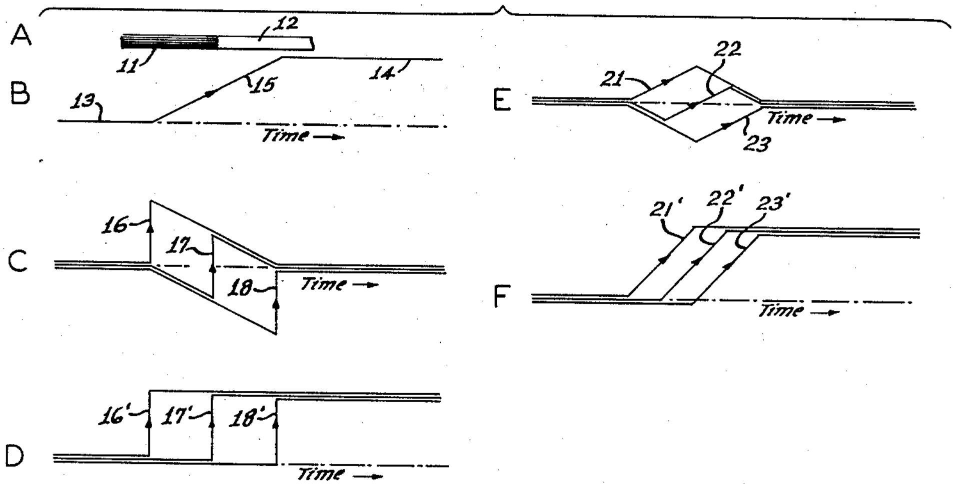
Fig. 1 shows explanatory wave forms of crispening under somewhat idealized conditions.

Referring to the drawings, Fig. 1(*a*) shows a fragment of a picture having a black portion 11 and a white portion 12, with a sharp line of demarcation between. For present purposes it may be taken as a portion of an object along a single scanning line. Fig. 1(*b*) represents the corresponding video signal having a lower amplitude 13 representing black and a higher amplitude 14 representing white. The transition slope 15 is not vertical since this would require an infinite bandwidth in the television system and also an infinitesimal scanning spot. Fig. 1(*b*) is of course idealized but suffices for the moment.

Fig. 1(*c*) illustrates three wave forms 16, 17 and 18 which, if added to the wave form in Fig. 1(*b*) will give the corresponding wave forms shown in Fig. 1(*d*) at 16′, 17′ and 18′. The latter waves have vertical transitions which would ideally represent the transition from black to white shown in Fig. 1(*a*). The difference in phase may be disregarded since it amounts, at most, to a slight displacement of the picture in the horizontal direction. Actually, wave forms like that shown in Fig. 1(*c*) are difficult to generate in a practical circuit and some compromise is advisable.

Fig. 1(*e*) illustrates wave forms 21, 22 and 23 which, when added to that of Fig. 1(*b*) will give the waves shown in Fig. 1(*f*) *at* 21′, 22′ and 23′. It will be noted that the rise time of the waves in Fig. 1(*f*) is approximately one-half that of Fig. 1(*b*), and hence will give a much sharper line of demarcation. This would correspond to a bandwidth of approximately twice that required to give the wave of Fig. 1(*b*), and hence is a considerable improvement. The wave forms shown in Fig. 1(*e*) can be approximated with relatively simple circuitry and hence represent a practical solution of considerable value.

Figure 2:
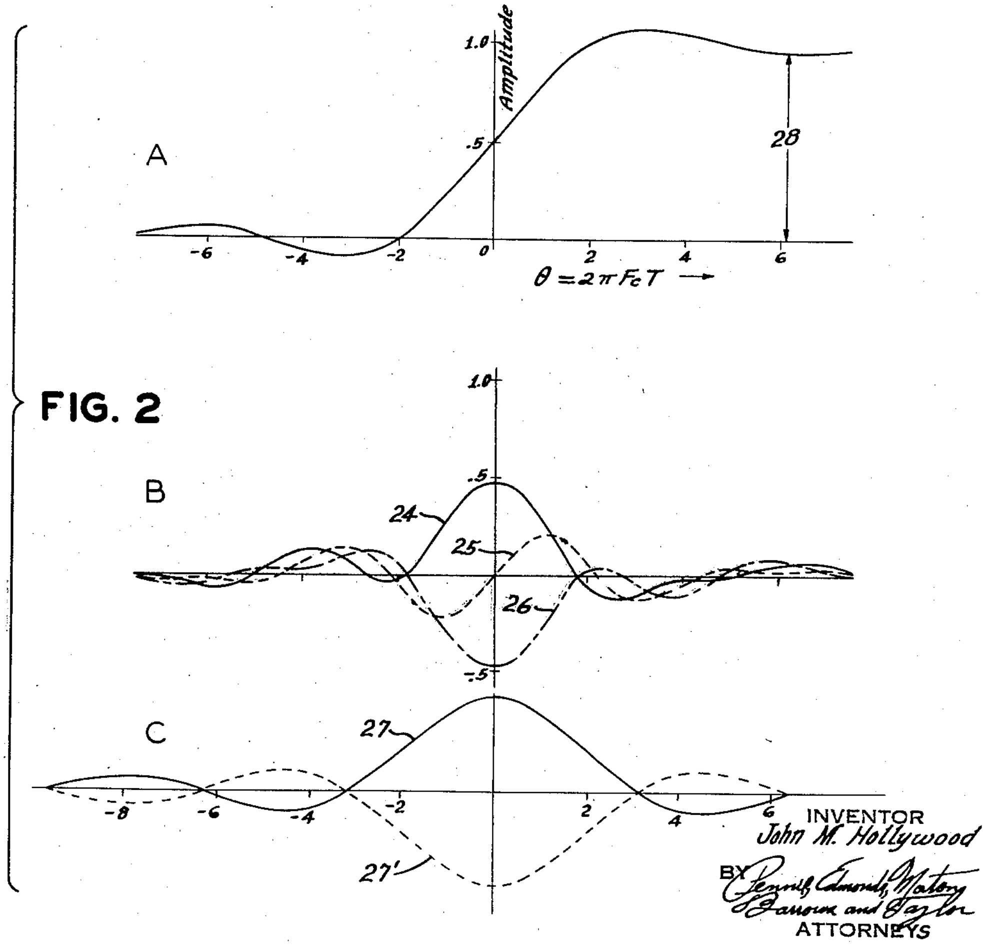
Fig. 2 shows explanatory wave forms taking into account the transition wave form of an ideal low pass filter.

In practice the type of transition wave form to be corrected would be more like that of Fig. 2(*a*) than Fig. 1(*b*). Fig. 2(*a*) represents the step response of an ideal low pass filter. That is, it represents the amplitude response of an ideal low pass filter to an applied wave which changes abruptly from one value to a higher value. The horizontal scale is in units representing $2\pi F_c T$, where $F_c$ is the cut-off frequency of the filter and T is time. Fig. 2(*b*) shows wave forms 24, 25 and 26, any one of which, when added to that of Fig. 2(*a*), will give a transition approximately twice as fast as that shown in Fig. 2(*a*). This then would correspond to a filter of approximately twice the cut-off frequency.

Wave forms 24 in Fig. 2(*b*) will be observed to have a central positive pulse preceded and followed by slight oscillations of decreasing amplitude. Wave form 26 is similar, but the central pulse is in the negative direction. Wave form 25 is a single cycle preceded and followed by slight oscillations of decreasing amplitude. While the slight oscillations in each case are theoretically necessary for the exact correction of the response of an ideal low pass filter, in practice filters are not ideal and often depart widely therefrom. Hence the generation of the slight oscillations in the correcting wave is a refinement unnecessary in practice. Consequently in subsequent discussion only the central pulses in the correcting waves will be considered.

With this understanding, it will be noted that the central correcting pulse in wave 24 is substantially the same as the central pulse in wave 26 but the two pulses are inverted, that is, of opposite polarity or phase. Either pulse may be obtained from the other by simple polarity inverting circuits, and either pulse may be employed to improve the transition speed of the wave of Fig. 2(*a*). The difference in the resultant is merely a slight phase displacement of the picture as a whole, such as illustrated at 21′ and 23′ of Fig. 1(*f*), and can be disregarded.

In the co-pending Goldmark et al. application referred to above it has been proposed to add the differential of the original signal in proper phase to improve the speed of transition. The differential of the wave shown in Fig. 2(*a*) is shown at 27 in Fig. 2(*c*). Wave 27′ represents the differential of a transition wave in the opposite direction, that is, going from a higher level representing white to a lower level representing black. While adding the differential to the original wave does steepen the transition and hence improves the crispness of a picture, it will be observed by comparing wave 27 with wave 24 that the central differentiation pulse of the differentiated wave is somewhat too broad for precise correction. This was realized in the application mentioned above and it was suggested to clip the differentiated wave at a suitable level in order to obtain a shortened pulse or spike for correction purposes. This results in material improvement in many cases but the use of a fixed clipping level gives the proper correction for only one transition amplitude, and hence a compromise is required to take care of transitions of different amplitude. Overshoots and undershoots are also sometimes troublesome.

From Figs. 2(*a*) and 2(*b*) it can be seen that the amplitude of the correcting pulse, such as 24, should be proportional to the transition amplitude 28. Also, the duration of the correcting pulse should be constant for a given transition interval, regardless of transition amplitude. The transition interval may conveniently be taken as the interval from $\theta=-2$ to $\theta=+2$ in Fig. 2(*a*). However, when the transition interval increases, corresponding to a decrease in transition slope, the length of the correcting pulse should increase in substantially like proportion. Inasmuch as the invention is primarily concerned with steepening transitions which are limited by the bandwidth of the circuits thru which the signal passes, it is most concerned with improving the steepest transitions which can be passed in the given bandwidth. Less steep transitions will be more perfectly reproduced by signal frequencies already present in the pass band, and hence will require little or no correction. However, increasing the length of the correcting pulses as the transition interval increases is of some importance to avoid false correction.

Generally speaking the amplitude of the differentiation pulses, such as 27 in Fig. 2(*c*), will be proportional to the transition amplitude 28 for a given transition interval. In accordance with the present invention the differentiation pulses are then operated upon in such a manner that the correcting pulses are shorter than the differentiation pulses and have substantially the correct duration for different transition amplitudes throughout a considerable range.

Figure 3:
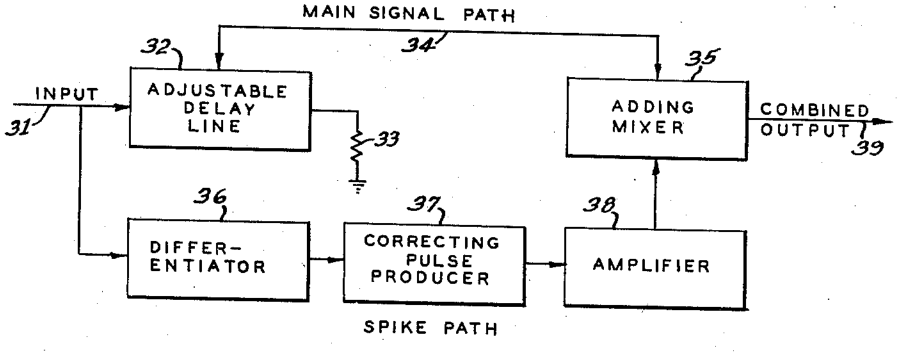
Fig. 3 is a block diagram illustrating the overall arrangement of apparatus according to the invention.

Referring now to Fig. 3, an input video signal is fed through line 31 to an adjustable delay line 32 which may be terminated by an appropriate resistance 33. From the delay line the video signal is fed through a main signal path 34 to an adding mixer 35. The main signal path 34 may contain amplifiers, and conventional peaking and preemphasis circuits may be employed if desired. In general, the video signal in this path is similar to that in the conventional television receiver, and its bandwidth need only be wide enough to accommodate the frequencies present in the input signal.

The input video signal from 31 is also supplied to a differentiator 36 in an auxiliary parallel channel. The output of the differentiator is supplied to a correcting pulse producer 37, a specific embodiment of which will be described in connection with Fig. 4. The overall function of the differentiator 36 and correcting pulse producer 37 is to produce correcting pulses which, when added to the original video signal, will produce a more rapid transition as discussed in connection with Figs. 1 and 2. The output of 37 is fed through an amplifier 38 to the adding mixer 35 where the correcting pulses are combined with the original video signal. The combined output is supplied through 39 to a suitable output circuit which may be a cathode-ray tube or a further video amplifier. After combining correcting pulses with the video signal it is desirable to employ circuits of much wider bandwidth in order that the crispening will not be impaired. In some cases the combining of original video signal and correcting pulses may take place in the utilizing circuit, so that a separate mixer is unnecessary. An example is shown in Fig. 7 wherein the addition takes place in the input circuit of a cathode-ray tube.

Referring now to Fig. 4, a simple correcting pulse producer circuit is shown which has been found to give excellent results in practice. As shown, two rectifiers 45, 45' are connected in back-to-back relationship in parallel between the input 41 and the output resistor 42. A reactance storage circuit is associated with each rectifier and here takes the form of a shunt R–C network composed of capacitor 43 and resistor 44, the shunt circuit being in series with rectifier 45. A similar R–C circuit composed of capacitor 43' and resistor 44' is connected in series with rectifier 45'. The rectifier and shunt R–C circuit in each path is in series connection with the signal source and output impedance here shown as resistor 42.

The input circuit 41 is supplied with the differentiated video signal from a source of low impedance. For transitions in the positive direction such as shown in Fig. 2(*a*), for example, it will be assumed that rectifier 45 passes current. For transitions in the opposite direction, rectifier 45' passes current.

Considering only rectifier 45 for the moment, it will be clear that the rectifier current flows through resistor 42 and hence the output voltage across the resistor is directly proportional to the rectifier current. The charging circuit for condenser 43 includes the rectifier, the low impedance signal source and the output resistor 42. The time constant of this charging circuit is made short, and advantageously is much shorter than the period of the highest frequency in the video signal. This highest frequency is, of course, dependent upon the pass band of previous circuits. The R–C network 43—44 serves to control the shape and duration of the correcting pulse or spike. In particular, the spike duration is mainly controlled by the R–C values of this network, although it is also influenced by the frequency responses of circuits both preceding and following the spike formation. Advantageously the time constant of the R–C circuit 43—44 is shorter than the period of the highest frequency in the applied video signal. In practice, time constants of one-half the period of the highest video frequencies, or less, have been employed with success.

The operation of the circuit of Fig. 4 will be more clearly understood by reference to the curves of Fig. 5. In Fig. 5(*a*) the curve 46 represents the differential of a single transition of the video signal. It corresponds to the central peak of wave 27 in Fig. 2(*c*), which is termed a differentiation pulse. Curve 46 may also be taken to represent the voltage appearing across capacitor 43 during the initial portion of the applied voltage when rectifier 45 is passing current. The voltage produced across capacitor 43 will not necessarily be the full applied voltage, but in general will be approximately proportional thereto.

After the peak 47 of the applied wave has been reached, the applied voltage across capacitor 43 drops. Capacitor 43 also discharges through resistor 44. For a short period after peak 47 is passed, the discharge of the capacitor through resistor 44 is sufficiently rapid so that the voltage across the capacitor tends to be somewhat less than the applied voltage. Thus current continues to flow through the rectifier, and the voltage across the capacitor continues to follow the applied voltage. However, at some point such as 48 the slope of the applied voltage wave 46 is greater than the slope of the exponential discharge curve of capacitor 43 through resistor 44, so that current ceases in rectifier 45 and the voltage across the capacitor decays along the exponential dotted line 49.

Fig. 5(*b*) indicates roughly the current through rectifier 45. Initially the current is zero, but as the applied differentiation pulse begins to rise at a point 51 the current through the rectifier starts to flow as indicated at 52. When point 48 is reached the rectifier current falls to zero as indicated at 53. Somewhere inbetween a current peak 54 is reached. The exact shape of the current wave depends upon many factors including the characteristic of the rectifier itself, the charging resistance, and the values of the R–C circuit 43—44.

It will be understood that Fig. 5(*b*) is given for purposes of explanation only and the exact shape may depart considerably therefrom. In general, however, the current stops flowing before the applied differentiation pulse has returned to zero (point 55). Hence the current pulse through the rectifier is shorter than the applied differentiation pulse 46. Since the rectifier current flows through resistor 42, the voltage pulse thereacross is similar to that shown in Fig. 5(*b*). By comparing Fig. 5(*b*) with wave 24 in Fig. 2(*b*) it will be observed that a wave shape has been produced which is more nearly of the correct form for steepening the transition in the original video signal. By suitable choice of circuit constants very nearly exact compensation can be obtained.

The operation of the upper branch of the circuit of Fig. 4 has been described in detail for positive transitions in the applied video signal. The lower branch of the circuit comprising rectifier 45' and the shunt C–R circuit 43', 44' comes into operation for negative transitions and functions similarly to the upper branch. The overall operation of the circuit is to supply correcting pulses or spikes for both positive and negative transitions. Correction in both directions is considered highly desirable in practice, but correction in only one direction may be employed if desired. In such case the unwanted branch of the circuit of Fig. 4 may be eliminated.

It has been stated that the time constants of the shunt C–R circuits 43, 44 and 43', 44' are advantageously shorter than the period of the highest frequency in the applied video signal. This enables the circuit to resume its initial condition rapidly after one transition has taken place, so as to be ready for the next transition. Thus the circuit can cope with transitions following in rapid succession. However, the time constant is advantageously sufficiently long so that the point 48 (Fig. 5(*a*)) at which the rectifier stops conducting is substantially beyond peak 47. The time constants mentioned above, and those described in specific embodiments hereafter, are given as an aid to the ready practice of the invention and have been found satisfactory. In a given case, they may be varied in order to obtain the most precise correction.

A consideration of Figs. 2(*a*) and 2(*b*) will show the desirability of centering the peak of the correcting pulse (e. g. 24) approximately midway of the transition slope of the original video signal in order to obtain the most precise correction. In Fig. 5(*a*) it will be noted that the peak 54 of the correcting pulse is displaced with respect to the peak 47 of the differentiation pulse. Accordingly, it is desirable to adjust the relative delays in the two channels of Fig. 3 so that the correcting pulses will occur approximately midway of the respective transitions in the original video signal at the point of addition. A certain amount of delay may exist in both channels, and in some cases the relative delay may be found suitable without additional correction. Where this is not the case, delay circuits may be inserted in one or both channels. Ordinarily a delay circuit in one channel suffices, and usually it has been found that it should be inserted in the main signal channel as indicated in Fig. 3. The provision of the necessary relative delay will be clear to those skilled in the art in view of the above discussion.

Fig. 6(*a*) shows oscillographs of positive and negative transitions in the original video signal, together with the steepened transitions produced in accordance with the invention. Curve 61 represents a positive transition in the normal video signal whose steepness is determined by the pass band of the previous circuits. When correcting pulses have been produced and added to the original signal, as described in connection with Figs. 3–5, a steepened transition as shown by curve 62 is obtained. This has approximately twice the steepness of 61 and represents a material improvement in the sharpness of the transition from black to white. Curves 63 and 64 are uncrispened and crispened waves for negative transitions, that is, from white to black.

Fig. 6(*b*) shows similar oscillographs for a transition level approximately half that of Fig. 6(*a*). It will be observed that the correction is still effective and that the transition curve is steepened in a manner very similar to that of Fig. 6(*a*), even though the change in level is only half as great.

Fig. 6(*c*) shows oscillographs of a ⅛ microsecond rectangular pulse after passing through a video amplifier having a 2 mc. bandwidth to the 3 db point, without and with crispening. Wave 65 represents the normal wave form of the short pulse which is considerably rounded due to the inadequate bandwidth. When the crispening circuit described in connection with Figs. 3–5 is employed, the leading and trailing edges are steepened and wave form 66 is obtained. This is a considerably closer approximation to the original pulse wave form and hence is a marked improvement in reproduction.

It will be noted that each of the oscillographs in Fig. 6 show slight trailing oscillations. These are due to ringing in the particular filter employed to limit the bandwidth of the applied signal to a known value at the time the oscillographs were taken. They can be much reduced by more careful filter designs, and hence can be disregarded in comparing crispened and uncrispened waves.

Fig. 7 illustrates the application of one embodiment of the crispening circuit of the invention to a conventional black-and-white television receiver, whose bandwidth was about 3.4 mc. This bandwidth is defined in the usual manner as the frequency at which the response is down 3 db. The circuit constants represent values which were found satisfactory for the uses to which this particular receiver was put. They are given as an aid to the ready practice of the invention only, and not by way of limitation. It will be understood that the specific values may be selected to suit the conditions of use, and also may be varied widely depending upon the judgment of the designer.

In Fig. 7 the portion of the circuit above the line 71 is that of one well-known commercial receiver except for connections 72, 73, 74 and the addition of the resistor 75 in the cathode circuit of the cathode-ray tube 76. The video signal is fed from a suitable output tube 77 through a coupling network designated generally as 78 to the control grid 79 of the cathode-ray tube. The coupling network 78 contains series and shunt peaking in accordance with conventional practice. Thus the signal applied to the grid of the cathode-ray tube is the normal video signal.

The portion of the circuit below line 71 is the additional channel which produces the correcting pulses or spikes for hastening the transition from black and white and vice versa at the edges of objects in the picture being reproduced. To this end the video signal is fed through line 72 and an R-C coupling circuit composed of capacitor 81 and resistor 82 to the grid of tube 83. An inductance 84 is connected in the anode circuit of tube 83 through coupling capacitor 85. Anode voltage is obtained from the B+ supply 86 through connection 73 and resistor 87. A variable cathode resistor 88 is employed as a gain control.

Tube 83 and the associated inductance 84 function as a differentiating circuit in accordance with the well-known equation $$e=L\frac{di}{dt}$$

Thus a voltage wave appears across inductance 84 which is substantially the derivative of the current through tube 83, and hence the derivative of the video signal applied to the grid of tube 83. Inasmuch as the primary object of the crispening circuit is to hasten transitions which are limited by the bandwith of preceding circuits, it is necessary to operate only on the higher frequency components in the video signal. Hence the coupling circuit 81—82 may be selected to attenuate the low frequency components of the signal, thereby preventing overload of tube 83.

Inductance 84 is used as an autotransformer with a tap at 89 to supply the correcting pulse or spike producing circuit generally designated as 91. The transformer ratio may be selected to provide the desired low output impedance without loading tube 83 to an extent which seriously affects the differentiating action. It is found helpful in some cases to place a small damping resistor 90 across the upper portion of inductance 84. It will be understood that the transformer ratio may be selected to suit the particular application and that in many cases a 1:1 ratio will suffice. While this particular differentiating circuit has been found satisfactory in practice, other forms of differentiating circuits are known to the art and may be employed if desired.

The circuit 91 is similar to that shown in Fig. 4 and need not be described again. The output of circuit 91 is supplied to amplifier tubes 92, 93 and 94 in cascade. These amplifying stages should preferably be designed to have a bandwith at least twice that of the normal video signal channel so as not to impair seriously the shape of the correcting pulses developed in the circuit 91.

The output of the last amplifier stage 94 is supplied through coupling capacitor 95 and connection 74 to the cathode 96 of the cathode-ray tube. The resistor 75 inserted in the cathode circuit of the cathode-ray tube enables the correcting pulses to be effectively applied to the cathode. Although the normal video signal is applied to the grid 79 and the correcting pulses to the cathode 96, these signals are in adding relationship insofar as the cathode-ray beam is concerned. Hence the original signal and correcting pulses may be considered to be added in the input circuit of the cathode-ray tube in the manner described in connection with Figs. 1–3. If desired, of course, the addition could be performed in a separate tube and the output supplied to either grid or cathode of the cathode-ray tube as appropriate. This will be clear from a consideration of Fig. 9 to be described hereinafter. In such case the circuits following the addition should preferably have double the bandwith of the normal video channel, or more. The correcting pulses may be added in positive or negative phase wyith respect to the corresponding transitions, as previously described.

In connection with Figs. 3 and 5 it was pointed out that in some cases it is necessary to insert a slight amount of delay in one channel, usually in the main signal channel in order that the peak of the correcting pulse shown in Fig. 5(*b*) will coincide approximately with the midpoint of the transition slope. In Fig. 7 the main signal path was found to have approximately the right delay so that no additional delay was necessary. Where additional delay is required, suitable changes can be made in the coupling circuit 78 for the purpose, or a separate delay line added.

The gain control 88 permits adjusting the amplitude of the compensating spikes or pulses so that the desired overall result is obtained. In many cases a fixed resistor of suitable value can be employed, or a semi-fixed resistor.

Fig. 8 shows a more elaborate circuit designed particularly for the improvement of pictures transmitted by coaxial cable for which the cutoff frequency is about 2.7 mc. The circuit has actually been used with color television signals transmitted in accordance with the present standards which allow approximately 4 mc. for the video band. It might equally well be employed with monochrome signals for which a 4 mc. band is also standard. Since the coaxial cable cuts off at about 2.7 mc., considerable definition and sharpness its lost in the reproduced pictures. In order to improve the sharpness, the crispening circuit of the present invention has been found extremely valuable. Switching arrangements are provided so that the signal can be used with or without crispening.

In Fig. 8 a coaxial cable 101 of 75 ohms impedance is connected to a switch 102. In the upper position of the switch the input video signal is fed through a similar 75 ohm cable 103 to an output switch 104 and thence to an output 75 ohm coaxial cable 105. Thus in the upper position of the switches the input video signal is fed through the apparatus without modification. The output at 105 has been fed to color video receivers for reproduction, but can be used for other purposes if desired.

In the lower position of switch 102, the incoming video signal is fed through a main signal path comprising the amplifier tube 106, delay line 107, amplifier tube 108 and adding mixer 109. The overall pass band of this main signal channel is fat within 1 db to 6 mc. and 3 db down at 9 mc., so as not to additionally attenuate the high frequencies in the incoming signal. A gain control 111 is provided so that the overall gain of the main signal path can be made unity. A shunt coaxial cable 112 and resistor 113 terminate the input coaxial cable properly in the lower position of switch 102.

The incoming video signal is supplied through connection 114 to the correction circuit in which spikes or pulses are generated for crispening the video signal. In the particular application for which this circuit was designed, the incoming video signal included synchronizing pulses. It is advantageous to eliminate these synchronizing pulses before producing the correcting spikes, so as to eliminate undesirably large spikes caused by the synchronizing pulses themselves. To this end tube 115 is employed as a clipper whose clipping level is adjusted by the variable cathode resistor 116. The circuit generally designated as 117 includes a pair of diodes and associated circuitry designed to eliminate the synchronizing pulses. These circuits may follow conventional practice and hence need not be described further for present purposes.

The resultant video signal is supplied to the differentiating tube 83. Tube 83, inductance 84 and correcting pulse producing circuit 91 are similar to those shown in Fig. 7 and hence need not be described again. The correcting pulses or spikes are amplified in tube 92, the parallel-connected sections of tube 118, and in tube 119. The design of these amplifying stages may follow conventional parctice and hence need not be described further. The output of tube 119 is fed through connection 121 to the plate of tube 108, so that the correcting pulses are fed to tube 109 along with the video signal in the main channel. With the circuit constants given, the correcting channel including tubes 92, 118, 119 and 109 has an overall pass band which is flat within 1 db to 8 mc., and 3 db down at 10.5 mc.

As described in connection with Fig. 7, the gain control 88 in Fig. 8 may be adjusted to give correcting pulses of proper amplitude. Furthermore the delay network 107 may be adjusted so that the peaks of the correcting pulses fall midway on the respective transition slopes. This has been explained previously in connection with Figs. 3–5. In some applications the value of the gain control resistor 88 and the amount of delay may be predetermined and fixed, or semi-fixed adjustments may be employed.

It will be understood that the specific circuit constants given in Fig. 8 are intended as an aid to the ready practice of the invention and give values which have been found suitable in one particular application. They are not intended as limiting. For example, when used with a video signal of 4 mc. bandwidth (down 3 db at 4 mc.), the 100$\mu\mu$f. shunt capacitors in circuit 91 have been changed to 50$\mu\mu$f. with advantageous results.

The embodiments of the invention described in connection with Figs. 4, 7 and 8 give rise times for transitions from black to white and vice versa, which are approximately twice that of the uncrispened signal. The crispening portion of the circuit is simple and the overall operation has been found very satisfactory. However, in some instances it may be desired to still further decrease the rise time, even at the expense of much more involved circuitry.

Figs. 9 and 10 show an embodiment in which much steeper slopes than 2:1 may be obtained. Referring first to the block diagram of Fig. 9, the incoming video signal at 131 is fed through a delay line 132 to an adder 133 in which are added the correcting pulses to form a combined crispened output at 134. In the correcting pulse or spike producing channel the video signal is first applied to a differentiator 135 which may take the form of that previously described. The differentiation pulses are fed directly to one clipping mixer 136. The differentiation pulses are also fed through a polarity inverter 137 and thence to a second clipping mixer 136'.

At this point reference may be made to Fig. 10 which shows wave forms occurring at points in Fig. 9 bearing corresponding letters. Throughout Fig. 10 full lines correspond to positive transitions and dotted lines to negative transitions.

Fig. 10(*a*) shows in full line a transition wave form whose rise time is determined by the pass band of preceding circuits. The dotted line shows a similar transition. This is the wave which is assumed to pass through delay line 132 to the added 133. It is also applied to differentiator 135 and yields the differentiated waves shown in Fig. 10(*b*) for positive and negative transitions, the central portions 151, 151' being termed the differentiation pulses and corresponding to the transition slopes. The wave of Fig. 10(*b*) is fed to clipping mixer 136. It is also fed through the polarity inverter 137 to obtain the corresponding waves shown in 10(*c*), which are then fed to clipping mixer 136'.

The differentiated waves of opposite polarity are also applied to a push-pull rectifier 138 as shown in Fig. 9, and thence through a delay line 139 and limiter 141 to a pulse-forming line 142. The push-pull rectifier will yield the waves shown in Fig. 10(*d*). It will be noted that the rectified wave is the same for both positive and negative transitions. The limiter 141 is adjusted to clip at a suitable lower level such as 143 and at a slightly higher level such as 144 to yield a substantially rectangular wave. The output of the limiter is then applied to the pulse-forming line 142 to obtain the short pulses shown in Fig. 10(*e*). As the amplitude of the rectified wave at the limiter is well above the clipping levels, the amplitude and timing of the pulses of Fig. 10(*e*) are almost independent of the transition amplitude of the wave of Fig. 10(*a*).

The pulses are then applied to the clipping mixers 136, 136' along with the differentiated signals. Considering positive transitions, the pulses of Fig. 10(*e*) are applied to clipping mixer 136 along with the differentiated wave shown in full line in Fig. 10(*b*). The positive pulse is indicated in Fig. 10(*b*) at 145. The clipping mixer is arranged to clip off the negative pulse of Fig. 10(*e*), and the simultaneous application of the positive pulse 145 and the differentiated wave modulates the amplitude of the positive pulse 145 in accordance with the amplitude of the differentiation pulse 151. This may be accomplished in a manner which will be understood by those skilled in the art. For example, the pulses of Fig. 10(*e*) could be applied to one control grid and the differentiated wave to another control grid of a vacuum tube, the first grid being biased to cut off negative pulses and pass current only during positive pulses such as 145, clipping off negative portions of the differentiated waves. The differentiation pulse 151 at the second control grid will determine the amplification of the short positive pulse 145 and hence its ampitude will be proportional to the amplitude of the differentiation pulse.

The pulses of Fig. 10(*e*) are also applied to clipping mixer 136′, and for negative transitions the differentiated wave at mixer 136′ will be positive as shown in dotted lines in Fig. 10(*c*). Mixer 136′ is adjusted in a manner similar to mixer 136, so that a pulse 145 whose magnitude is proportional to that of the differentiation pulse 151′ is passed to the output circuit. The output of mixer 136 is passed directly to adder 146, and the output of mixer 136′ passes through a polarity inverter 147 to adder 146. Thus the output of adder 146 contains positive-going short pulses corresponding to positive transitions, and negative-going short pulses corresponding to negative transitions, in each case the magnitude of the pulses being proportional to the respective transition levels.

The output of adder 146 is then applied to an integrating circuit which is conventionally a C–R integrator 148. The time constant of the integrating circuit is selected to yield steeply rising wave-fronts when pulses are applied thereto, and fairly rapidly decaying waves after the pulses cease. This is illustrated in Fig. 10(*f*). When added to the initial video signal, repeated in Fig. 10(*g*) with slight time delay, the corresponding waves of Fig. 10(*h*) are obtained. As shown, the transition slope has been greatly increased and hence represents a much more rapid change from black to white and vice versa.

It is desirable to select the phase of the correcting pulses shown in Fig. 10(*f*) with respect to the phase of the video signal shown in Fig. 10(*g*) so that the transition slope is increased in the most effective manner, such as shown for example in Fig. 10(*h*). The relative phase or time occurrence of the initial video signal and correcting pulses in adder 133 may be adjusted or preset by appropriate delay circuits in the two channels. In the specific embodiment illustrated a delay circuit 132 in the main signal channel causes the video signal of Fig. 10(*g*) at adder 133 to be somewhat delayed from the initial video signal shown in Fig. 10(*a*). The delay network 139 causes the rectified differentiated signal of Fig. 10(*d*) to be delayed with respect to the differentiated signal itself shown in Figs. 10(*b*) and 10(*c*). The delay produced in 139 in conjunction with the clipping levels 143, 144 determines the initiation of the positive pulse of Fig. 10(*e*). Thus the uncorrected video signal and the correcting pulses may be combined in adder 133 in the phase which gives the most advantageous steepening. Of course, in a given application one or both of the specific delay networks may be omitted and the other circuits designed so that the desired overall phase relationship is obtained.

The embodiment described in Figs. 9 and 10 provides correction for transitions in both directions, and this is highly advantageous. If desired, however, correction in only one direction can be obtained by omitting one clipper mixer circuit. In this event the push-pull rectifier need not be employed inasmuch as the differentiation pulses may be used directly to drive the limiter and pulse-forming line, rather than indirectly by rectification. Pulse-forming circuits other than that specifically described may of course be employed if desired.

In the foregoing description several specific embodiments of the invention have been described and illustrative wave forms given. It will be apparent to those skilled in the art that many changes may be made in the circuitry shown, within the scope of the invention. For example, Fig. 4 illustrates a current-fed rectifier circuit with a shunt C-R circuit in series with the rectifier. The principle of duality may be employed to obtain an equivalent voltage-fed rectifier circuit with an L–R circuit, if desired. This and other modifications and variations are possible within the scope of the invention.

I claim:

1. In a television video circuit for use with video signals subject to rapid transitions in video amplitude, apparatus having input means responsive to said video signals and output means for improving the crispness of pictures reproduced from a video signal which comprises a first circuit means connected to supply a video signal from said input means to said output means, a differentiating circuit supplied from said input means and adapted to differentiate at least the higher frequency components of the video signal to yield differentiation pulses corresponding to rapid transitions in video signal amplitude, rectifier circuit means including an associated reactance circuit for producing shortened pulses from applied pulses of at least one polarity, circuit connection means for supplying said differentiation pulses of at least said one polarity in the output of said differentiating circuit to said rectifier circuit means to obtain shortened correcting pulses corresponding to respective differentiation pulses, and circuit connection means for supplying the output of said rectifier circuit means to said output means along with said video signal to increase the speed of said transitions.

2. In a television video circuit for use with video signals subject to rapid transitions in video amplitude, apparatus having input means responsive to said video signals and output means for improving the crispness of pictures reproduced from a video signal which comprises a first circuit means connected to supply a video signal from said input means to said output means, a differentiating means supplied with said video signal from said input circuit and adapted to differentiate at least the higher frequency components of the video signal to yield differentiation pulses corresponding to rapid transitions in video signal amplitude, rectifier circuit means supplied with said differentiation pulses from the output of said differentiating circuit and including a rectifier with a shunt resistance-capacitance circuit in series therewith, the time constants of said rectifier circuit means being selected to yield shortened current pulses through said rectifier from the applied differentiation pulses, and circuit connection means for supplying correcting pulses corresponding to said shortened current pulses to said output means from said rectifier circuit means along with said video signal in phase to increase the speed of said transitions.

3. In a television video circuit for use with video signals subject to rapid transitions in video amplitude, apparatus having input means responsive to said video signals and output means for improving the crispness of pictures reproduced from a video signal of predetermined bandwidth which comprises a first channel means connected to supply said video signal from said input means to said output means, a second channel means connected between said input and output means, said second channel means including a differentiating circuit for differentiating at least the higher frequency components of said video signal to yield differentiation pulses corresponding to rapid transitions in video signal amplitude, and a rectifier circuit means including an associated reactance circuit for producing shortened pulses from applied pulses of at least one polarity, said rectifier circuit means being supplied with said differentiation pulses of at least said one polarity from said differentiating circuit to yield shortened correcting pulses from the differentiation pulses, and delay circuit means in at least one of said channel means predetermined to cause the peaks of said correcting pulses to coincide substantially with the midpoints of corresponding transitions in the video signal in said output circuit, whereby the speed of said transitions may be increased.

4. In a television video circuit for use with video signals subject to rapid transitions in video amplitude, apparatus having input means responsive to said video signals and output means for improving the crispness of pictures reproduced from a video signal of predetermined bandwidth which comprises a first channel means connected to supply said video signal from said input means to said output means, a second channel means connected between said input and output means, said second channel means including a differentiating circuit of low output impedance for differentiating at least the higher frequency components of said video signal to yield differentiation pulses corresponding to rapid transitions in video signal level, and a rectifier circuit means including a rectifier with a shunt resistance-capacitance circuit in seris therewith, the time constants of said rectifier circuit being selected to yield shortened correcting pulses from the applied differentiation pulses, said rectifier circuit means being supplied with said differentiation pulses of at least one polarity from said differentiating circuit, and delay circuit means in at least one of said channel means predetermined to cause the peaks of said correcting pulses to coincide substantially with the midpoints of corresponding transitions in the video signal in said output means, whereby the speed of said transitions may be increased.

5. In a television video circuit for use with video signals subject to rapid transitions in video amplitude, apparatus having input means responsive to said video signals and output means for improving the crispness of pictures reproduced from a video signal of predetermined bandwidth which comprises a first channel means connected to supply said video signal from said input means to said output means, a second channel means connected between said input and output means, said second channel means including an electronic tube having an input control circuit supplied with at least the higher frequencies of said video signal and an anode output circuit of low impedance including an inductive differentiating circuit for yielding differentiation pulses corresponding to rapid transitions in video signal amplitude, a rectifier circuit in said second channel connected to said anode output circuit, said rectifier circuit including a rectifier, a shunt resistance-capacitance circuit and an output resistance connected in series, the charging time constant of said rectifier circuit and the discharge time constant of said resistance-capacitance circuit being shorter than the period of the highest frequency in said video bandwidth to yield current pulses through said output resistance shorter than respective applied differentiation pulses, circuit connection means for supplying correcting pulses corresponding to said shorter current pulses to said output means, and delay circuit means in at least one of said channel means predetermined to cause the peaks of said correcting pulses to coincide substantially with the midpoints of corresponding transitions in the video signal in said output means, whereby the speed of said transitions may be increased.

6. In a television video circuit for use with video signals subject to rapid transistions in video amplitude, apparatus having input means responsive to said video signals and output means for improving the crispness of pictures reproduced from a video signal of predetermined bandwidth which comprises a first channel means connected to supply said video signal from said input means to said output means, a second channel means connected between said input and output means, said second channel including a differentiating circuit for differentiating at least the higher frequency components of said video signal to yield differentiation pulses corresponding to rapid transitions in video signal amplitude, and a rectifier circuit including a pair of rectifiers each having a reactance circuit associated therewith, circuit connections supplying the output of said differentiating circuit to said rectifier circuit with the rectifiers poled in opposite directions, the time constants of said rectifier circuit being selected to yield shortened correcting pulses from the applied differentiation pulses, whereby shortened correcting pulses of opposite polarity may be obtained from differentiation pulses corresponding to transitions in opposite directions, and delay circuit means in at least one of said channel means predetermined to cause the peaks of said correcting pulses to coincide substantially with the midpoints of corresponding transitions in the video signal in said output means, whereby the speed of said transitions may be increased.

7. In a television video circuit for use with video signals subject to rapid transitions in video amplitude, apparatus having input means responsive to said video signals and output means for improving the crispness of pictures reproduced from a video signal of predetermined bandwidth which comprises a first channel means connected to supply said video signal from said input means to said output means, a second channel means connected between said input and output means, said second channel means including a differentiating circuit of low output impedance for differentiating at least the higher frequency components of said video signal to yield differentiation pulses corresponding to rapid transitions in video signal level, and a rectifier circuit connected to the output of said differentiating circuit and including a pair of rectifiers each having a shunt resistance-capacitance circuit in series therewith, said rectifiers and respective series circuits being connected in parallel with the rectifiers oppositely poled, an output resistance in series with said parallel connected rectifier circuits, the charging time constant of each rectifier circuit and the discharge time constant of each of said shunt resistance-capacitance circuits being short compared to the period of the highest frequency in said video bandwidth whereby shortened correcting pulses of opposite polarity may be obtained from differentiation pulses corresponding to transitions in opposite directions, the phase of the correcting pulses from said second channel means being predetermined with respect to the phase of the video signal in said first channel means to yield a corrected video signal in said output circuit of increased transition speed.

8. In a television video circuit for use with video signals subject to rapid transitions in video amplitude, apparatus having input means responsive to said video signals and output means for improving the crispness of pictures reproduced from a video signal of predetermined bandwidth which comprises a first channel means connected to supply said video signal from said input means to said output means, a second channel means connected between said input and output means, said second channel means including a differentiating circuit for differentiating at least the higher frequency components of said video signal to yield differentiation pulses corresponding to rapid transitions in video signal amplitude, a rectifier circuit connected to the output of said differentiating circuit and including a pair of rectifiers each having a shunt resistance-capacitance circuit in series therewith, said rectifiers and respective series circuits being connected in parallel with the rectifiers oppositely poled, an output resistance in series with said parallel connected rectifier circuits, the charging time constant of each rectifier circuit and the discharge time constant of each of said shunt resistance-capacitance circuits being short compared to the period of the highest frequency in said video bandwidth whereby shortened correcting pulses of opposite polarity may be obtained from differentiation pulses corresponding to transitions in opposite directions, and delay circuit means in at least one of said channel means predetermined to cause the peaks of said correcting pulses to coincide substantially with the midpoints of corresponding transitions in the video signal in said output means, whereby the speed of said transitions may be increased.

References Cited in the file of this patent

UNITED STATES PATENTS

| | | |
|---|---|---|
| 2,134,094 | Andrieu | Oct. 25, 1938 |
| 2,182,326 | Urtel | Dec. 5, 1939 |
| 2,227,630 | Carnahan | Jan. 7, 1941 |
| 2,243,599 | Herbst | May 27, 1941 |
| 2,263,376 | Blumlein | Nov. 18, 1941 |
| 2,273,163 | Wilson | Feb. 17, 1942 |
| 2,421,138 | Wheeler | May 27, 1947 |
| 2,678,388 | Loughlin | May 11, 1954 |
| 2,678,389 | Loughlin | May 11, 1954 |
| 2,678,964 | Loughlin | May 18, 1954 |

FOREIGN PATENTS

| | | |
|---|---|---|
| 413,401 | Great Britain | July 19, 1934 |